United States Patent [19]

Webber, Jr.

[11] Patent Number: 4,943,979
[45] Date of Patent: Jul. 24, 1990

[54] LOCAL ACCESS NETWORK SIGNAL REGNERATOR

[75] Inventor: Harold H. Webber, Jr., Berkeley, Calif.

[73] Assignee: Farallon Computing Corporation, Emeryville, Calif.

[21] Appl. No.: 193,854

[22] Filed: May 12, 1988

[51] Int. Cl.$^5$ .................... H03K 11/00; H04L 25/60
[52] U.S. Cl. .................................. 375/4; 370/94.3; 375/7
[58] Field of Search .................. 375/4, 36, 121.7; 370/13, 85, 94, 89, 95; 455/606; 340/825.5

[56] References Cited

U.S. PATENT DOCUMENTS

| | | | |
|---|---|---|---|
| 4,466,107 | 8/1984 | Stoner | 375/36 |
| 4,479,228 | 10/1984 | Crane | 375/36 |
| 4,562,581 | 12/1985 | Tanaka et al. | 375/121 |
| 4,617,565 | 10/1986 | Nakata et al. | 455/606 |
| 4,700,344 | 10/1987 | Kaino et al. | 370/13 |
| 4,701,910 | 10/1987 | Ulug | 340/825.5 |
| 4,709,364 | 11/1987 | Hasegawa et al. | 370/85 |
| 4,719,617 | 1/1988 | Yanosy, Jr. et al. | 370/85 |
| 4,723,311 | 2/1988 | Moustakes et al. | 370/94 |

Primary Examiner—Robert L. Griffin
Assistant Examiner—Stephen Chin
Attorney, Agent, or Firm—Skjerven, Morrill, MacPherson, Franklin & Friel

[57] ABSTRACT

A multiple port signal regenerator for facilitating communication between a plurality of (two or more) computers and computer peripheral devices ("computer products") in a local access network. The regenerator includes logic circuits that: (1) receives, processes and transmits an incoming message from a source computer product and ignores subsequently received incoming messages from other computer products until the first-received message is processed; (2) suppresses or ignores, for a predetermined punishment time interval, subsequent messages received from a source computer product, if temporal length of a message received from the source exceeds a predetermined protocol time interval; and (3) after the end of a message is received, determines when the lines of a network are all idle so that the regenerator can be re-activated to receive another incoming message from a computer product in the network.

5 Claims, 8 Drawing Sheets

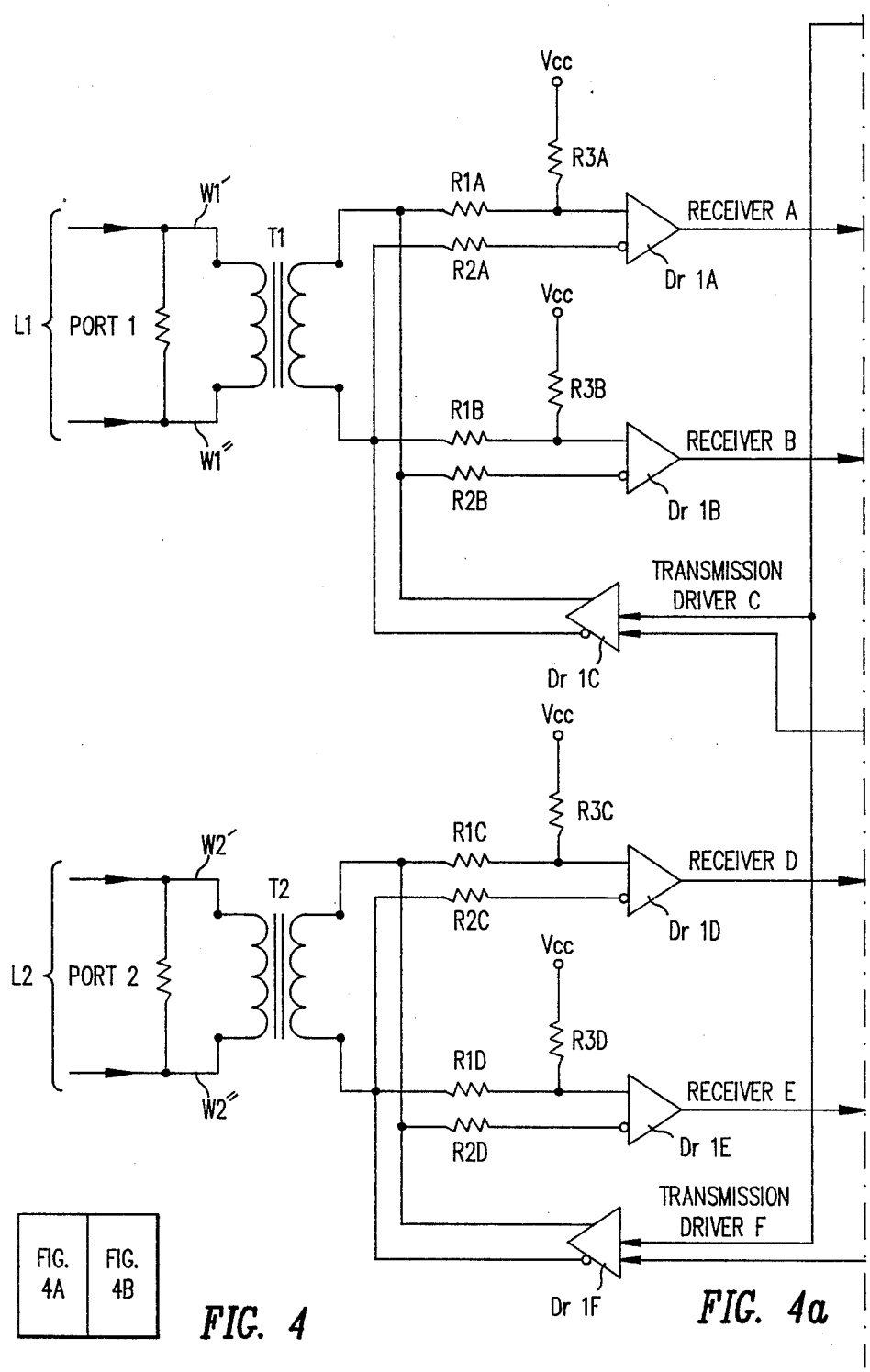

| FIG. 5A | FIG. 5B |

LOCAL ACCESS NETWORK SIGNAL REGENERATOR

FIELD OF THE INVENTION

This invention relates to multiple port signal regeneration of signals transferred between computer products in a local access network.

BACKGROUND OF THE INVENTION

The AppleTalk local area network described by Sidhu et al. in U.S. Pat. No. 4,689,786 is a cost effective protocol for the exchange of data among a large variety of data processing devices through a simplex communications medium. The most common embodiment of a physical communications channel for AppleTalk is a passive, shielded, twisted pair cable that is routed from node to node. There are several deficiencies inherent in the use of shielded cable and a bus topology.

Foremost among them is the difficulty and expense of routing cables from point to point, especially within occupied rooms or buildings. Second, shielded cable is more expensive and less common than unshielded cable, and it has higher transmission loss characteristics. Third, a passive medium such as shielded cable contains no means for signal regeneration, and this limits the number of devices and amount of cable that can be interconnected. Finally, a passive medium contains no means to isolate and contain the deleterious effects of common faults such as short or open circuits or nodes that fail to obey the media access protocols. As disclosed in copending application Ser. No. 06/899,413, filed Aug. 22, 1986 by Reese Jones and assigned to Farallon Computing, Inc., the assignee of this application, these deficiencies can be overcome in a broadcast communications system based on unshielded telephone quality cabling arranged in a hierarchical star topology with active signal regenerators at the star hubs.

Telephone wiring is inexpensive, abundant, and already installed in the majority of sites that might require data communications. Telephone wiring most often uses a hierarchical star topology, such as illustrated in FIG. 1. Separate cable are routed from each point of service to a common point of interconnection, such as a wiring closet. These interconnection points then are wired back to another point of interconnection, such as a distribution frame servicing an entire building. To build a broadcast communications channel using a hierarchical star wiring system, one must provide active multiport signal regenerators at the star centers (e.g., in the wiring closets).

A multiport signal regenerator must attach to a number of wire pairs routed to points of potential data service consumption. Data processing equipment may or may not be attached to any particular access point. To initiate communications with another device, a node transmits a message onto a wire pair to which it is attached. Because each wire pair is a multiaccess simplex medium, the message travels in both directions and arrives at all other nodes attached to the same pair and to the signal regenerator. The basic function of the signal regenerator is to sense the presence of an incoming message, regenerate it, and transmit it to all other wire pairs. Full interconnectivity is achieved exactly as on a passive bus; that is, every node can receive the messages of every other node. A signal regenerator may connect to other signal regenerators as necessary to interconnect as many access points as desired.

There are several aspects of the data link protocols of AppleTalk that make the design of a multiport signal regenerator difficult. A specification of minimum interpacket delay has been omitted. It is therefore possible for the beginning of one transmission to overlap or immediately follow the end of another. The AppleTalk protocols also do not specify an interval at the start of each transmission for the purpose of synchronizing bit timing recovery circuits. These two omissions require that a signal generator be able to very quickly release one port and select another as messages are relayed. If making port selection takes too long, the beginning portions of messages can be lost or corrupted.

An additional problem with the AppleTalk data link protocols is the inclusion of a fast "sync" pulse at the start of certain transmissions. The purpose of this pulse is to decrease the probability of collisions of signals issued by stations wishing to transmit. Unfortunately, this sync pulse has the same characteristics as impulse noises; thus this pulse might otherwise be removed by the system as undesirable. However, because these sync pulses must be faithfully reproduced, a signal generator must quickly select and release ports.

The AppleTalk data link protocols assume a multiaccess, simplex transmission medium. The most common implementation of a line is a twisted wire pair to which nodes and signal regenerators couple through an isolation transformer. Data links such as the AT&T Starlan network generally use two lines, each a pair of wires, connected between each computer or computer peripheral device (collectively designated as "computer products" herein) and a central control device; one line serves to receive messages and the other line serves to transmit messages. Here, line driver and receiver circuits are coupled to the same line, one pair of wires over which all messages travel to and from a given computer product. By increasing driver output levels and increasing receiver sensitivity, one can increase the amount of cable through which error-free transmission can be made. However, doing so increases the time it takes a driven line and coupling transformer to settle after relaying a message. Reflections from shorted or unterminated lines also increase the time it takes a driven line to settle. If these transient conditions are mistaken for a valid incoming signal, a port could be erroneously selected. Further, a signal regenerator could become unstable, continuously selecting and deselecting ports falsely, or repeatedly ignoring valid incoming signals.

Thus, fast response time, noise immunity, and sensitivity require a three way tradeoff for the design of a multiport AppleTalk signal regenerator.

SUMMARY OF THE INVENTION

One purpose of this invention is to provide a multiple port signal regenerator that allows full interconnectivity on a local access network ("LAN") over unshielded, voice grade wire, such as telephone wire, in a star topology network.

Another purpose of the invention is to provide a signal regenerator that uses a single line, a pair of unshielded wires, to communicate with each computer product in the network.

A third purpose of the invention is to provide a timing circuit that will allow receipt and transmission of one message at a time among computer products and will allow subsequent transmissions between computer products only after the lines have resettled to an idle state from the immediately preceding transmission of a signal or after a predetermined maximum time interval for a single message has been exceeded.

Other objects of the invention, and advantages thereof, will become clear by reference to the detailed description and the accompanying drawings.

In accordance with these objects, the invention in one embodiment may include logic circuits that: (1) receives, processes and transmits an incoming message from a source computer product and ignores subsequently received incoming messages from other computer products until the first-received message is processed; (2) suppresses or ignores, for a predetermined punishment time interval, subsequent messages received from a source computer product, if temporal length of a message received from that source exceeds a predetermined protocol time interval; and (3) after the end of a message is received, determines when the lines of a network are all idle so that the regenerator can be re-activated to receive another incoming message from a computer product in the network.

DETAILED DESCRIPTION OF THE INVENTION

In accordance with the invention (called a Star Controller) a multiport signal regenerator provides full AppleTalk interconnectivity over unshielded, voice grade telephone wire in a star topology. Source port selection is accomplished very quickly on a first come, first served basis. Reliable operation is achieved by continuously examining various aspects of signal quality at each port. Reflections from shorted or open cables are ignored, and transmissions that are longer than the AppleTalk protocols allow are promptly aborted. Special management and diagnostic features allow a remote computer system to enable or disable ports and to test the signal transport quality of the cables attached to each port.

Figure 1:
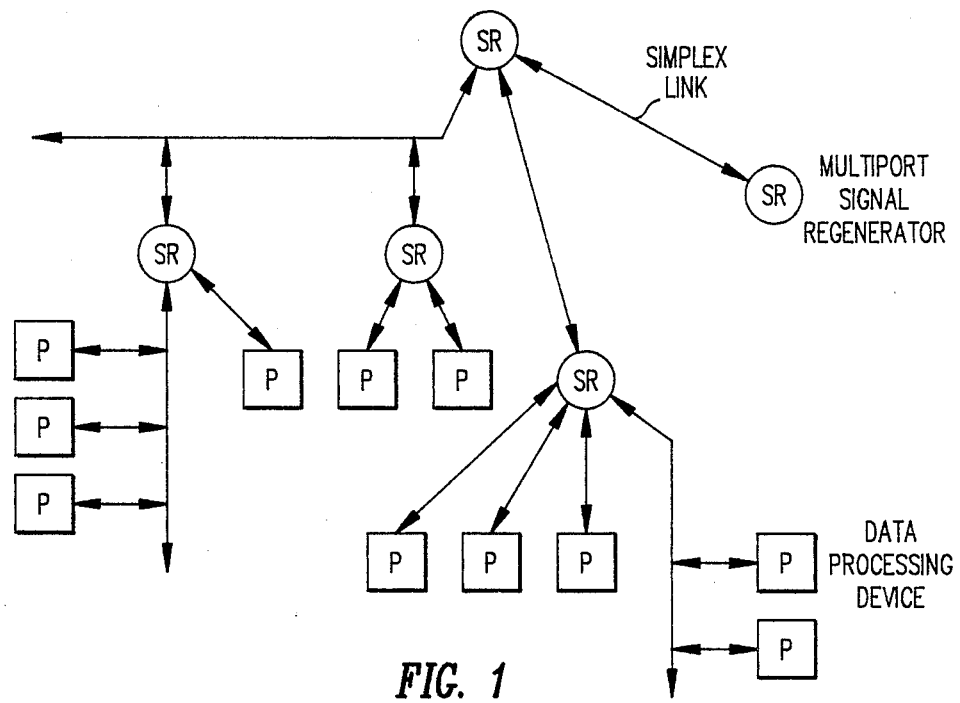
FIG. 1 is a schematic view of a hierarchical star topology network that might be used in a LAN.

In one embodiment, the Star Controller may have 12 (or more) isolated ports, one for each leg of an active star that is centered at the controller, and a separate port for network management. This is illustrated in FIG. 1, which shows three signal regenerators SR, each in a star topology with associated computer products P and connected by simplex links, with each signal regenerator sR being connected to a master signal regenerator SR*. Each leg of a star may include up to 3,000 feet of cable; a plurality of devices, or even one or more additional active stars, may be attached to a leg. The Star Controller management bus operates independently of an associated system such as AppleTalk so that any problems in one leg of a star are easily isolated and identified.

The Star Controller has several basic operating states. Initially it lies idle, waiting for an incoming signal. As soon as a valid incoming signal is detected on a port, that port is selected as the signal source and all other ports are made to transmit a copy of the signals received. The message is relayed continuously until the end of the message is detected, or until a present protocol violation interval elapses. The Star Controller then stops transmitting a copy of the incoming message and ignores signal activity on all ports until transient conditions have disappeared and the network lines have resettled to an idle state; the Star Controller then returns to the idle condition, ready to relay the next message. This settling might require a time interval of 8–35 $\mu$sec., as discussed below.

The line driver and receiver circuit, and the manner in which the start and end of messages are detected, are important for reliable operation of the Star Controller. This task is performed by the circuits illustrated in FIGS. 2 and 4.

Figure 2:
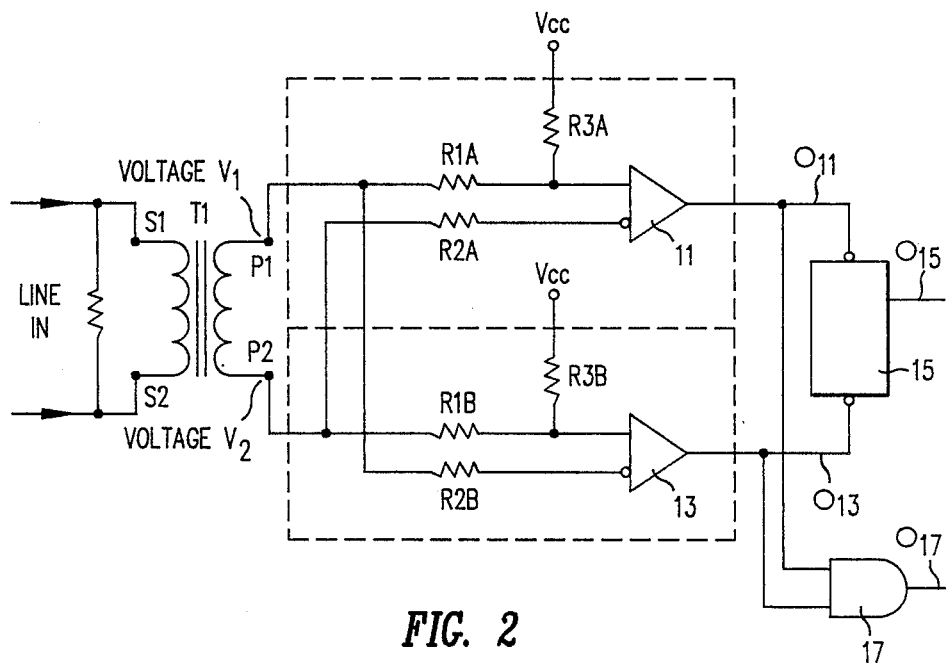
FIG. 2 is a schematic view of circuits used in a receiver/transmitter module in one embodiment of the invention.

In FIG. 2, Star Controller receiver/circuit detects incoming data on the lines and provides an indication of line activity. This circuit uses a unique arrangement of two line receivers to receive data while introducing a minimal amount of edge jitter (signal transition timing errors), and the circuit can detect line activity (or inactivity) very quickly. It is common practice to perform these functions by dedicating separate line receivers to the functions of data reception and line activity detection; this approach introduces edge jitter, which can cause errors, and detects line activity of only one polarity; this increases port selection/deselection response time.

In the Star Controller receiver circuits, incoming data are coupled to the line receivers through a pulse transformer T1 whose output terminals produce signals $V_1$ and $V_2$. Resistor input bias networks R1A/R3A/$V_{cc}$ and R1B/R3B/$V_{cc}$ for the two line receivers 11 and 13, respectively, offset the voltage detection threshold of the receivers (from zero volts) by a predetermined amount $V_{(offset)} = V_T$. The two receivers 11 and 13 are connected to the pulse transformer T1 with opposite polarities so that the output signals of the receivers are of opposite polarity. The output signal $O_{11}$ of line receiver 11 is low only when the incoming differential voltage $V_{in}$ is more positive than the threshold level $V_T$ set by its bias network. The output signal $O_{13}$ of line receiver 13 is low only when the incoming differential voltage $V_{in}$ is more negative than the threshold level $-V_T$ set by its bias network. The incoming differential voltage thus produces the following output signals:

$$V_T < V_{in} \qquad O_{11} = 0, O_{13} = 1,$$
$$-V_T < V_{in} < V_T \quad O_{11} = O_{13} = 1,$$
$$V_{in} < -V_T \qquad O_{11} = 1, O_{13} = 0$$

When the incoming differential voltage is within the "voltage window" ($|V_{in}| = |V_1 - V_2| < V_T$), both receiver outputs are high; the two output signals $O_{11}$ and $O_{13}$ cannot be simultaneously low.

Figure 3:
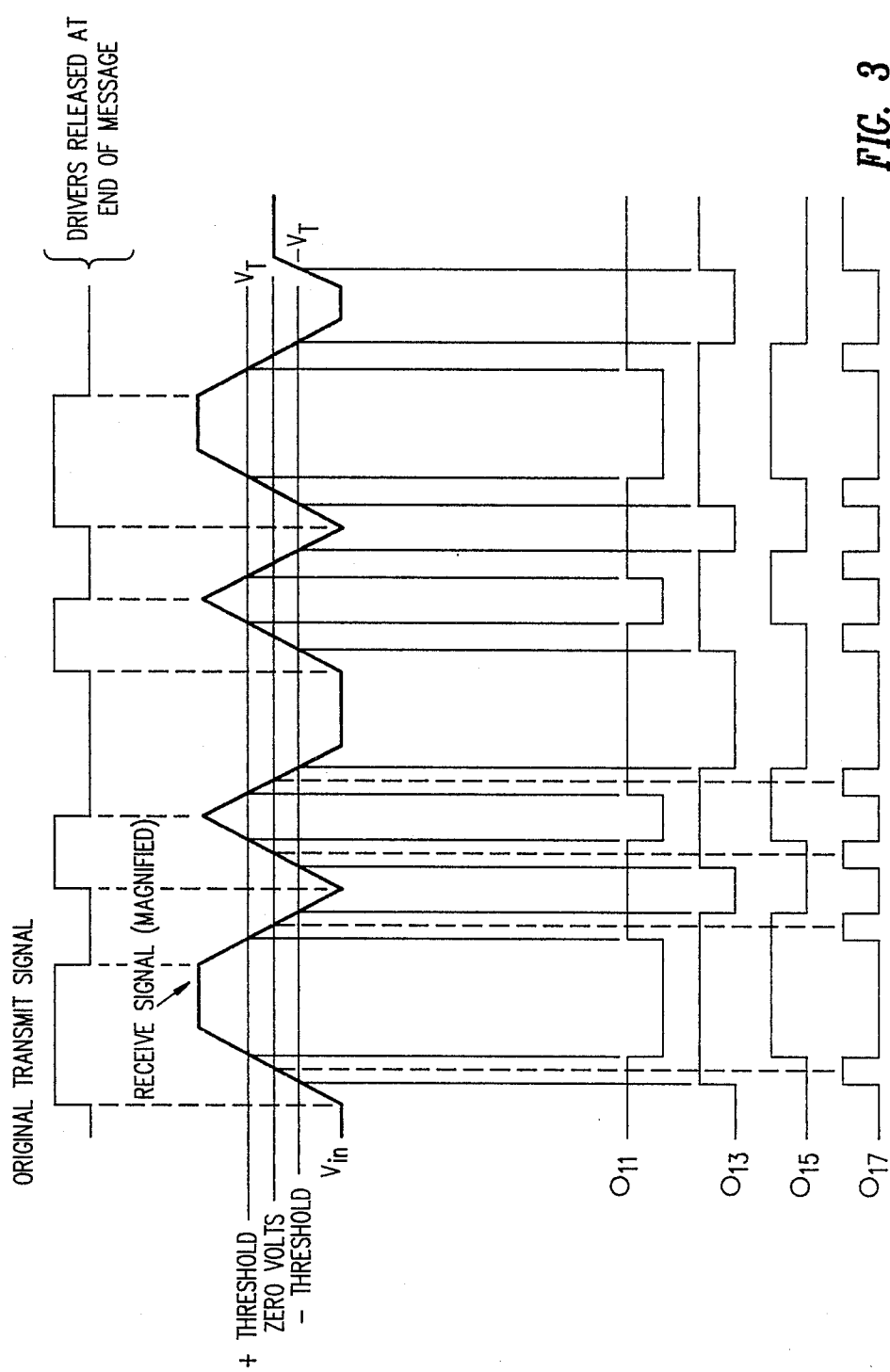
FIG. 3 is a graphic view of the voltage signals appearing at various input and output terminals in FIG. 2.

FIG. 3 illustrates the timing diagrams of the receiver outputs. The top diagram depicts an incoming message (voltage) that has traveled through a line extending from a computer product to the Star Controller. Note that the edges of finite slope combine with the non-zero detection offsets to introduce timing errors in the outputs of the two receivers; transitions in the output signals of the line receivers 11 and 13 in FIG. 2 do not coincide in time with zero crossings in the incoming waveform. By attaching the outputs of the receivers to the set and reset input terminals of a flip flop circuit 15 in FIG. 2, these timing errors can be cancelled. Note that the waveform output signal from the flip flop 15 is substantially identical to the incoming waveform signal $V_{in} = V_1 - V_2$; and the output waveform has transitions displaced by a substantially constant time interval from the times for zero voltage crossings of the incoming waveform.

A signal indicating that a valid incoming signal is present can be derived by combining the output signals of the receivers in an AND gate 17. When the incoming differential voltage signal $V_{in}$ is within the voltage window, the outputs of both receivers are high, and the output signal of AND circuit 17 is also high; if this condition persists for at least a predetermined time $\tau_{bit}$, this indicates that this line is currently idle. An initial fall of the output signal $O_{17}$ from gate 17 indicates that a message is incoming; this transition is used by other logic to initiate a port selection. During the course of relaying a message, the circuit monitors the output signal $O_{17}$ to detect the end of a message; if $O_{17}$ goes high and stays high for more than one half a bit time interval, it is assumed the source node has stopped transmitting its message and that no more message bits will follow. Note that the start of a message is detected immediately, regardless of the polarity of the incoming signal, and that the end of a message is detected within one half of a bit time. For a transmission rate of 230 KHz, a bit time interval is $(230 \text{ KHz})^{-1} = 4.35$ μsec; and one half a bit time interval may be taken to be about 2.5 μsec.

Once the end of a message is detected, the Star Controller stops relaying the incoming message and waits for transient conditions on all ports to settle before the Controller re-arms itself for another message relay operation. The receiver line-idle detection logic described above is used during this time interval to sense when all lines have settled sufficiently after the end of this message is received; this requires a varying time interval, determined by the system logic itself, of 8-35 μsec.

Several factors influence how quickly transient conditions cease after a signal is transmitted onto a line. One factor is the particular pattern of data transmitted at the close of a message. A vestige of the line-idle detection process is that a pulse of length one half bit time is appended to the end of a message. If the message ends with a complete bit, the appended half bit will produce a message having a one and a half bit pulse width at its close. This pulse essentially adds a bias to the lines and increases the settling time for the lines. To compensate for this, the Star Controller reverses the polarity of the signal transmitted for an additional one half bit time before releasing the line drivers. This has the effect of undoing the bias introduced on the lines by the line-idle detection process so that the transmit lines settle as fast as possible.

Once the port transmission drivers are released, the length and termination status of the attached cables determine how long the ports take to settle. On a shorted or open (unterminated) cable, some of the outgoing signal energy is reflected back into the port. The longer the line, the longer the time required for this reflected energy to die out and for the line to return to an idle state. While the lines are settling, the Star Controller must wait. If the Star Controller re-arms itself too soon, a port with reflections from an unterminated cable could falsely be selected as the source of an incoming message, wasting time and increasing the chance that valid messages will be lost. If the Star Controller waits too long before rearming itself, the beginning of the second of two overlapping or closely spaced messages might be ignored and the message might be damaged. The Star Controller copes with this tradeoff by waiting an amount of time that varies between a minimum and maximum time interval. If, after the minimum time interval of length $\tau_{idle}(\min)$ elapses, all lines appear idle, the Star Controller returns to the idle state, ready to relay another message. If all lines have not settled after the maximum time interval of length $\tau_{idle}(\max)$ has elapsed, the Star Controller rearms itself and assumes that the lines have not settled because there is an incoming message on one of the lines. If the lines have not all settled after the time interval $\tau_{idle}(\min)$ but the lines all subsequently settle (simultaneously) at some time $\Delta t$ with $\tau_{idle}(\min) < \Delta t < \tau_{idle}(\max)$, the Star Controller again returns to the idle state at that (later) time.

The Star Controller may, optionally, contain a microprocessor and low speed communications or management link to control access to the network and to diagnose problems with the attached cables. Messages sent on the management link can command the Star Controller to enable or disable selected ports. Incoming messages on disabled ports are ignored, and messages are not transmitted at disabled ports Also, line activity on disabled ports is ignored during the end-of-message wait interval.

Ports can be disabled automatically by timing logic that detects a message temporal length $\Delta t_m$ that is longer than the maximum time $\Delta t_1$ allowed by the AppleTalk protocols. This condition arises through failure of hardware or software at communicating nodes. If this condition is allowed to persist, all communications would be blocked by the "jamming" signal. The system identifies a computer product, if any, that is issuing a jamming signal by measuring the temporal length $\Delta t_m$ of each message received and processed from each computer product. In addition to controlling port access, the Star Controller may, optionally, count the number of messages relayed, determine the utilization of network bandwidth, and test the signal quality of the line attached to each port.

The Star Controller can be commanded to increment a counter each time the Controller logic begins to relay a message. One useful application of this ability is to check for excessive impulse noise on lines attached to ports. By enabling only the line under test, it is possible to count the number of times that a line senses a signal strong enough to trigger a message relay cycle. If the counter increments when there should be no signal traffic, or if the number of messages relayed per unit time is greater than that allowed by the AppleTalk protocols, it can be inferred that excessive noise is induced in the line under test. These counts can be read out over the management link for analysis by a remote computing system.

The Star Controller can measure network bandwidth utilization by sampling the operating state of the message relaying logic at regular intervals. Whenever the logic is sampled and found to be busy, a counter is incremented. The value of the counter can be read by messages exchanged over the management link and software can determine the percentage of utilization from the count and from knowledge of the sampling interval and rate.

The Star Controller can measure the signal transport quality of the lines attached to ports. This is accomplished by disabling all ports but the one under test, sending a test message out that port, and measuring how long the message relay logic waits for that line to settle. If the line is properly terminated it will settle quickly, in less than 8 μsec for a line of maximum length 3,000 feet, and the time measured will equal the normal minimum wait interval. Reflections from a shorted or open line will prolong the settling time interval. The Star Controller measures the length of the settling time interval by incrementing a counter at a high rate while the message relay logic is waiting for lines to settle. A remote computer system can then read this counter and determine the settling time, and therefore the termination status of a line.

Figure 4B:
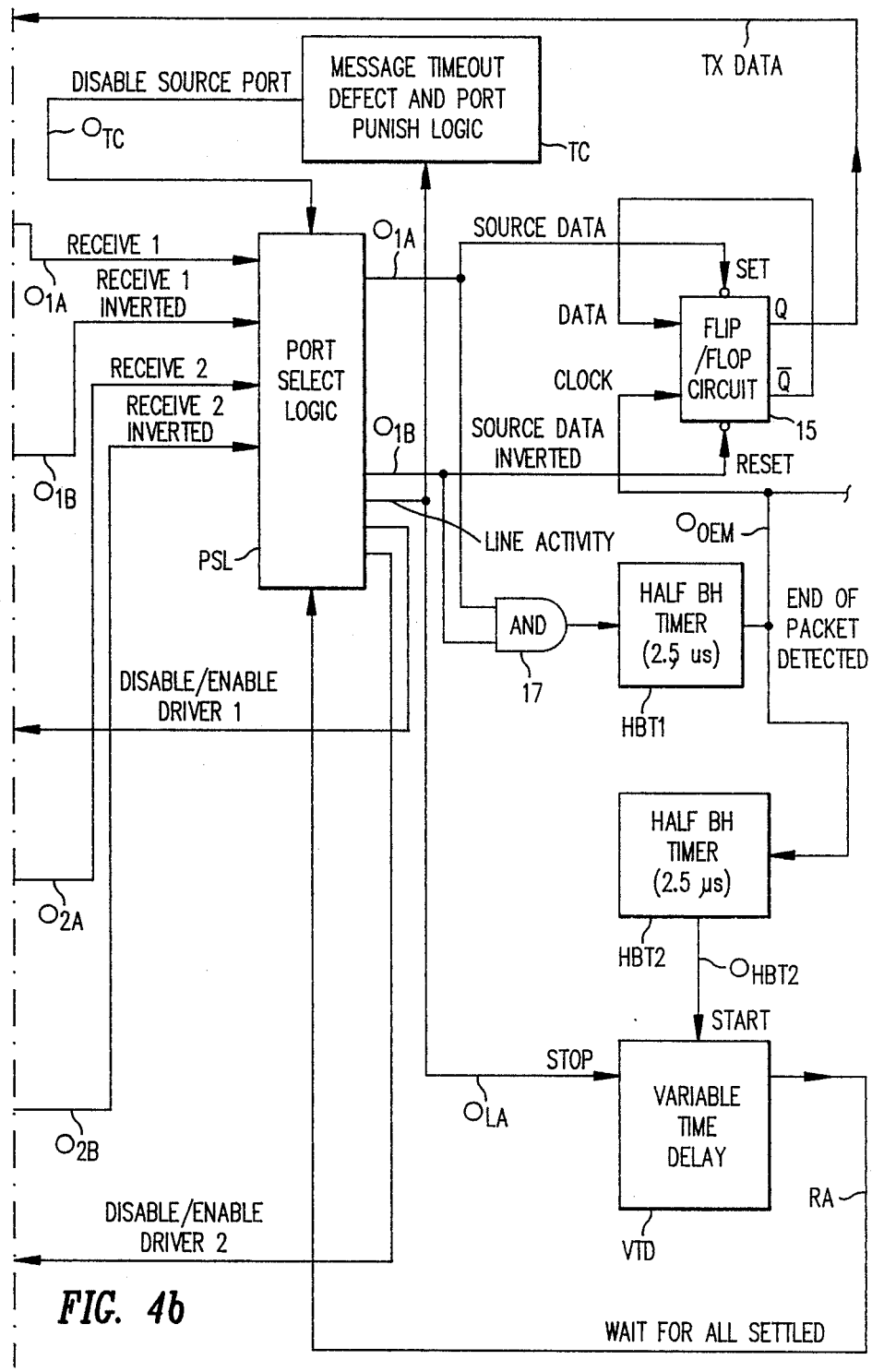
FIG. 4 is a schematic view of a transceiver circuit and timing circuit that can receive messages from or transmit messages to a plurality of computer products (not shown), according to one embodiment of the invention.

FIG. 4 illustrates a line interface circuit, including a transceiver circuit and a timing circuit, of the Star Controller in one embodiment in which the lines L1 (unshielded wires W1' and W1'') and L2 (unshielded wires W2' and W2'') transmit signals between two computer products and the Star Controller. The wires W1' and W1'' are connected, respectively, to the first and second primary terminals of a transformer T1 and may be connected to each other across a resistor R1 of resistance value substantially 120 ohms. The transformer T1 turns ratio may be 1:1 or 1:n with n>1, and the transformer itself may be of conventional design; purposes of the transformer T1 are to sharpen or increase the temporal slope of a signal passing through T1 and to isolate the line L1 from the interface circuit. The first and second secondary terminals of T1 are connected, respectively, to the positive terminals (denoted by +) of two substantially identical receiver driver means Dr1A and Dr1B across resistors R1A and R1B; the first and second secondary terminals of T1 are also connected, respectively, to the negative terminals (denoted by −) of the second and first receiver driver means Dr1B and Dr1A, respectively, across resistors R2B and R2A. The four resistors R1A, R1B, R2A and R2B may be substantially identical and may each have resistance values of substantially two kilo-ohms The positive terminals of each of the driver means Dr1A and Dr1B are connected across substantially identical resistors RA3 and RB3, respectively, each of resistance value substantially 10 kilo-ohms, to a positive or negative voltage source $V_{cc}$, in order to introduce a voltage bias at each of the driver means Dr1A and Dr1B; the voltage output transitions from Dr1A and Dr1B then occur at a predetermined non-zero voltage $V_T$ as discussed above in connection with FIGS. 2 and 3. The driver means Dr1A and Dr1B produce output signals $O_{1A}$ and $O_{1B}$ at their respective output terminals, and these output signals are passed to two input terminals of a programmable array logic device PSL (Port Select Logic) that may receive similar input signals from each computer product or from a subset of such products. The driver means Dr1A and Dr1B may be standard line drivers such as the AMD 26LS32; and the PAL may be an AMD PAL16L18L configured to produce the desired output signals.

The wires W2' and W2'' from a second computer product are similarly brought to the two primary terminals of a transformer T2, as shown in FIG. 4; the secondary terminals of T2 are similarly connected to the appropriate positive and negative input terminals of a pair of receiver driver means Dr2A and Dr2B; and the output signals from these driver means are similarly fed to appropriate input terminals of the port select logic PSL. FIG. 4 illustrates the arrangement for two computer products, but the system may be expanded to any reasonable number of computer products.

The line interface circuit associated with each computer product also includes a transmitter driver means, D1C, for computer product no. 1, as shown in FIG. 4, that receives a first input signal I1C from the PSL and a second (common) input signal TXDATA from a flip flop logic circuit FF that will be described later, at two input terminals of this driver means. Driver means Dr1C may be a dual differential/quad line driver such as the AMD 26LS30 that is suitable for operation at the RS-422 or RS-423 standard. Driver Dr1C has two output terminals and issues a first output signal $O_{1C}$ and its complement $O_{1D}$, respectively, at these two terminals. Each output signal may be slew rate limited so that, for example, the time required for an output signal voltage to increase from 10 percent to 90 percent of its full value may be around 200 nsec. The output signals $O_{1C}$ and $O_{1D}$ of the driver Dr1C are fed to the first and second secondary terminals, respectively, of the transformer T1 for transmission to the associated computer product.

Initially the system is idle, with no messages being received or processed or transmitted. In this state, the output voltage signals of all receiver driver means are high, as discussed in connection with FIGS. 2 and 3; the voltage signal pairs $O_{1A}$, $O_{1B}$, etc. all reside in the voltage "windows" shown in FIG. 3.

Assume a message arrives at transformer T1 from computer product no. 1. The message is initially detected by the output signal $O_{1A}$ or $O_{1B}$ going low; these two cannot go low together. All other output signals $O_{2A}$, $O_{2B}$, etc. remain high. The Port Select Logic PSL, which may be an AMD PAL16L8L device suitably programmed, identifies the incoming port (here, no. 1), disables the transmission driver means Dr1C, enables all transmission driver means except Dr1C, and locks out or ignores subsequently received signals from other computer products so that a copy of the incoming message from computer product no. 1 can be transmitted to all other computer products. The source data and inverted source data (substantially, the output signals $O_{1A}$ and $O_{1B}$ from driver means Dr1A and Dr1B) are substantially the output signals $O_{11}$ and $O_{13}$ discussed in connection with FIGS. 2 and 3 and are combined in a flipflop circuit 15 as shown in FIG. 4 to produce a relatively jitter-free copy of the incoming message from the source (computer product no. 1) at the output terminal Q, as discussed above in connection with FIGS. 2 and 3. The flipflop circuit 15 may be an AMD 74HC174 or any equivalent device. The output signal at Q of the flipflop circuit 15 is then fed back to all transmission driver means, with transmission driver means Dr1C disabled, for transmission to all computer products except the source (computer product no. 1 in this example)

The end of the incoming message is detected by the system when both the source data $O_{1A}$ *and inverted source data* $O_{1B}$ go high for a time interval longer than half a bit time interval ($\Delta t_{bit} \approx 4.35$ μsec at 230 KHz transmission rate). When this occurs, the output signal of the flipflop circuit 15 is toggled to invert the last bit of incoming data to equalize the message for end-of-message detection purposes.

The fact that both signals $O_{1A}$ and $O_{1B}$ have gone high (=1) is detected by an AND gate 17, which receives these two signals and issues a high signal that is received by a half bit timer circuit HBT1; this latter circuit is activated only by receipt of a high signal, and it then counts off half a bit interval (about 2.5 μsec). If the input signal $O_{17}$ received form the AND gate 17 has remained high for the entire half bit time interval, the system concludes that the end of the incoming message has been received, and half bit timer HBT1 issues an end-of-message signal (pulse) $O_{EOM}$ that is received by another half bit time HBT2 and is received as a clock-pulse by the flipflop circuit 17. The second half bit time HBT2 counts off an additional half bit time interval and then issues a signal (pulse) $O_{HBT2}$ that is received by a variable time delay circuit VTD; this latter circuit also receives an output signal $O_{LA}$ from the port select logic PSL that indicates that some message line (L1 in this example) is active or that no line is active. The variable time delay circuit VTD is activated only when it receives pulse signal $O_{HBT2}$ from the half bit timer HBT2; the action of VTD is discussed below.

When the flipflop circuit 15 receives a clock pulse $O_{OEM}$ from the half bit timer HBT1, the circuit 15 issues an output signal that is the last signal increment received by 15 at its data input terminal D. This last signal increment is received from the $\overline{Q}$ output terminal of circuit 15 and is the logical complement of the last signal increment issued at the Q output terminal of circuit 15. The effect of this is to add to the incoming message received at port 1 a half bit signal increment that is the logical complement of the last half bit signal increment of the original message, to "equalize" the end of the message as discussed above. This augmented message is sent by the system through the transmission driver means (for example, Dr2C) to the non-source computer products.

During the time the incoming message is being received and processed, a counter in a message timeout and port punishment logic circuit TC is determining the (increasing) length of this message. If this message ends before the message temporal length $\Delta t_m$ has reached a suitable predetermined protocol time interval $\Delta t_1$ such as 50 msec, all lines and drivers are left in their current states. If $\Delta t_m$ reaches the predetermined value $\Delta t_1$, the length of the message from computer product no. 1 is at least 50 msec, indicating that the source is probably operating in a "jamming mode." In this instance, the circuit TC issues a disable source port signal $O_{TC}$ to the port select logic PSL; the network promptly shuts down or disables port 1, suppresses or ignores all subsequent portions of this message received, and "punishes" the offending computer product (source) by continuing to ignore or suppress messages received from this source for a predetermined time interval $\Delta t_2$ that may be 5–10 seconds or even more. The minimum feasible protocol time interval $\Delta t_1$ is probably about 25 msec; a choice of $\Delta t_1 = 50$ msec is also acceptable.

Assume the message temporal length $\Delta t_m$ is $>50$ msec. The message is received from the source, and a copy (augmented) is sent to all other computer (non-source) products substantially simultaneously. After the augmented message ends and the last of this message issues from the transmission driver means, a certain time interval $\tau_{idle}$ will be required before all lines finally settle into idle states again, assuming no new message is received. Where a line of length 3,000 feet (maximum feasible length for one leg of the network) is not terminated by a suitable resistor, a signal issued on a line will produce a partial reflection at the unterminated end and a disturbance will return to the issuing end about 6 μsec later. To account for other signal characteristics, the time interval $\tau_{idle}$ is taken as substantially 8 μsec minimum and substantially 35 μsec maximum; the time allowed for the network to settle into an idle state again is variable and is determined by the system itself for each message received and re-issued. The variable time delay circuit VTD also detects the end of the (augmented) message, then counts 8 μsec, then interrogates all driver lines to determine whether such lines are all idle. If all such lines are idle at that time, the system re-arms itself through issuance of a re-arm output signal RA by the variable timed delay circuit VTD. The signal RA is fed to the port select logic device PSL; PSL in turn issues enable signals to all receiver driver means and transmission driver means, and the system is ready to receive another incoming message from a computer product. If not all lines are idle when the lines are interrogated by the variable time delay circuit VTD after the $\Delta t = 8$ μsec waiting time, the system waits and re-arms itself through issuance of the signal RA at VTD only after all lines have returned to the idle state, if the elapsed waiting time $\Delta t$ does not exceed a predetermined time $\tau_{idle}$(max)~35 μsec. If the elapsed time $\Delta t$ since end of the message reaches $\tau_{idle}$(max)~35 μsec, the system concludes that another message is arriving; the circuit VTD promptly issues a re-arm signal RA, and the system re-arms itself to receive the (remainder of the) incoming message at one of the receivers. The use of timing numbers such as the 2.5 μsec half bit interval, the 8–35 μsec waiting time and the timeout interval of 50 msec are not crucial here; these numbers may vary with the embodiment used.

Although a preferred embodiment has been shown and described herein, variation and modification may be made without departing from the scope of the invention.

Figures 5, 5A:
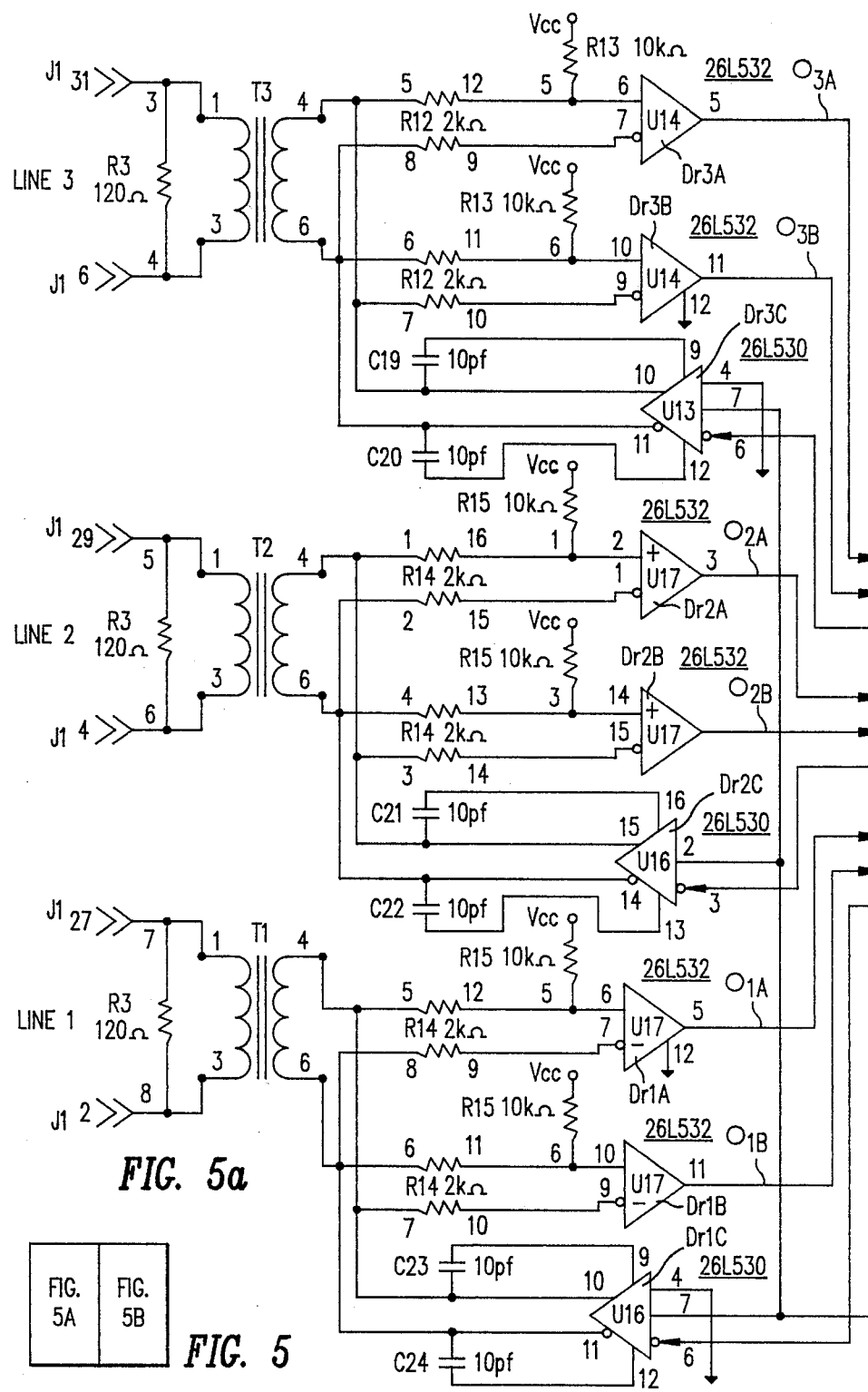
FIGS. 5 and 6 are more detailed schematic views of one embodiment of the transceiver circuit and the timing circuit, respectively.
Figure 5B:
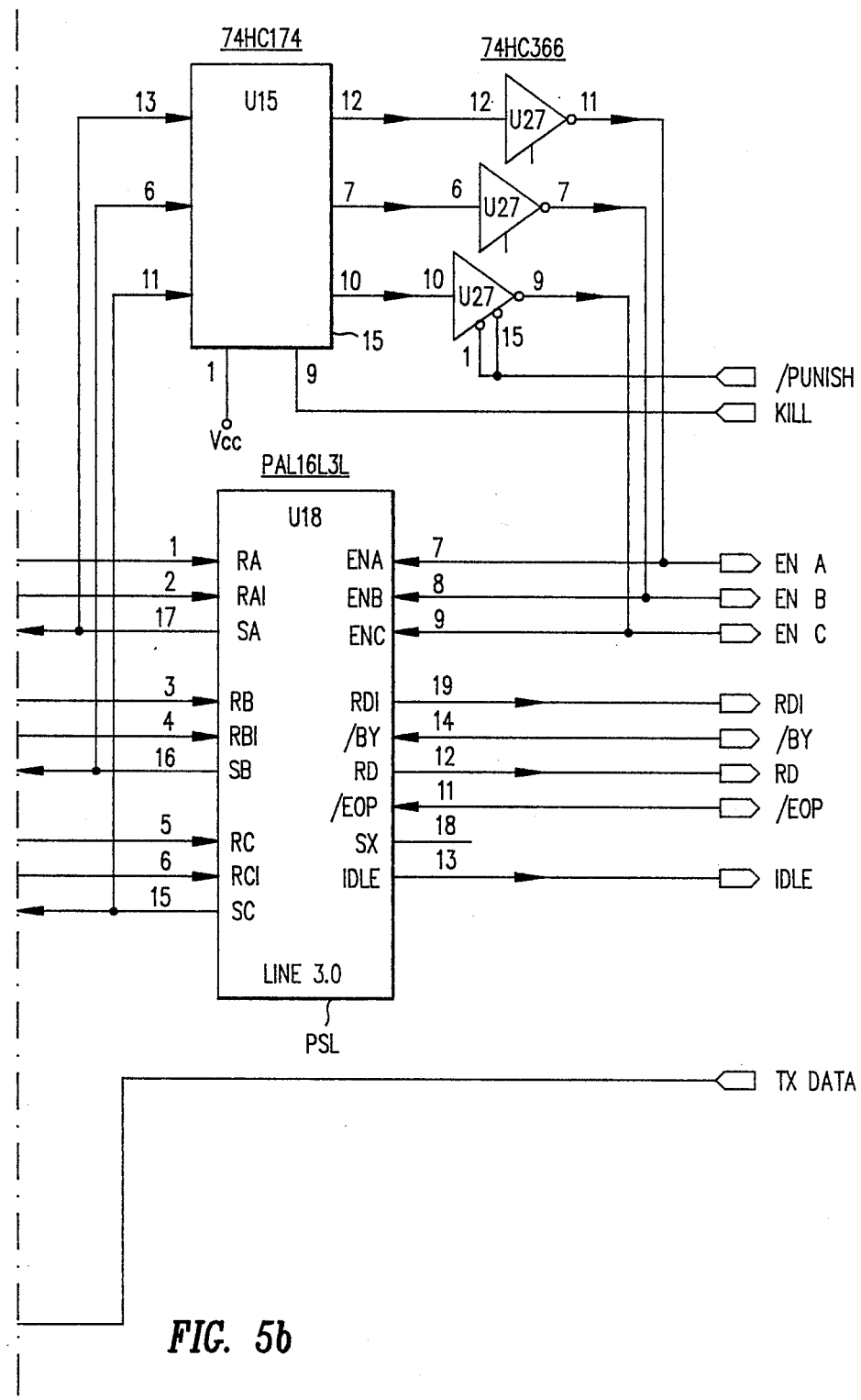
Figures 6, 6A:
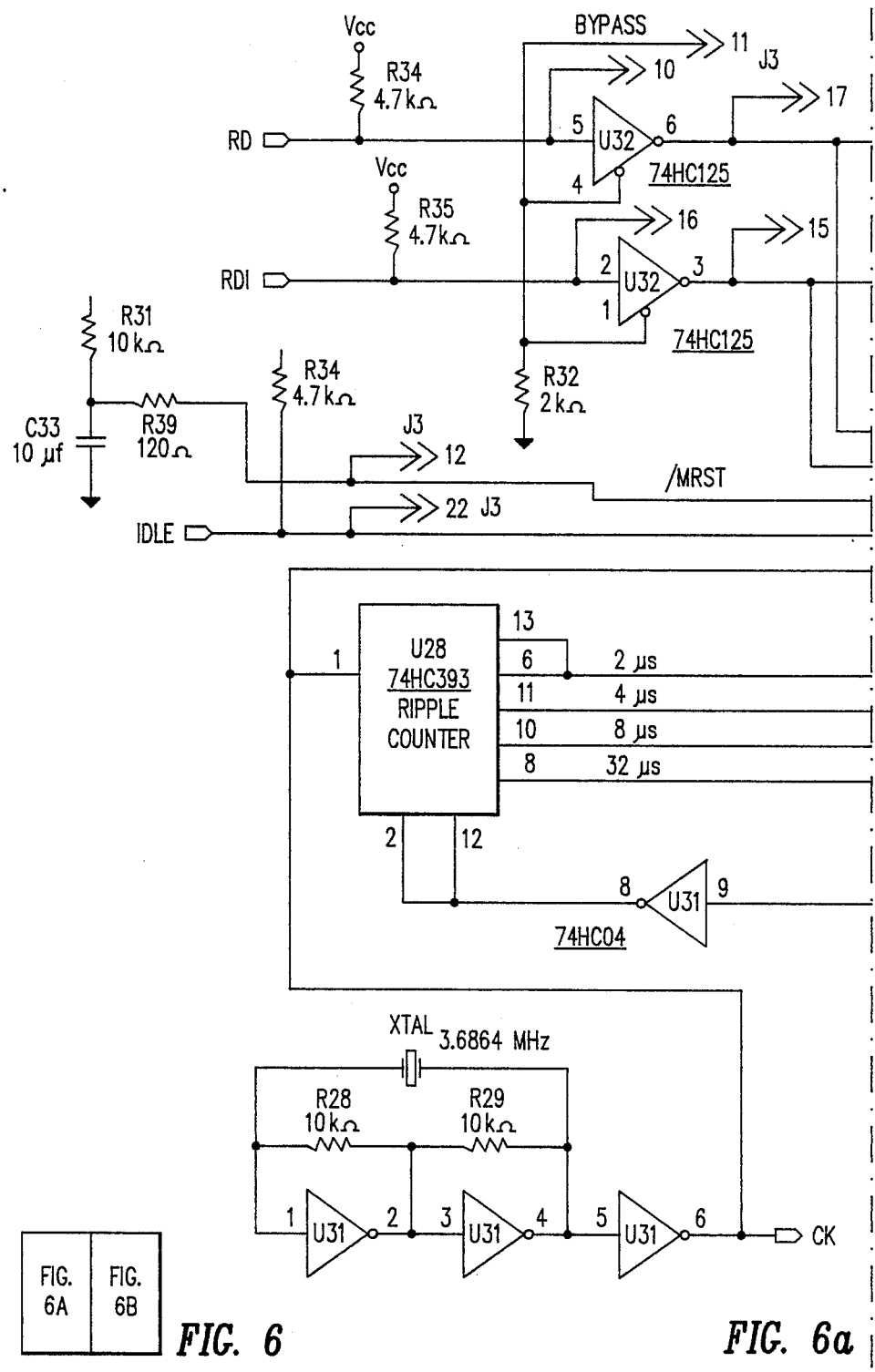
Figure 6B:
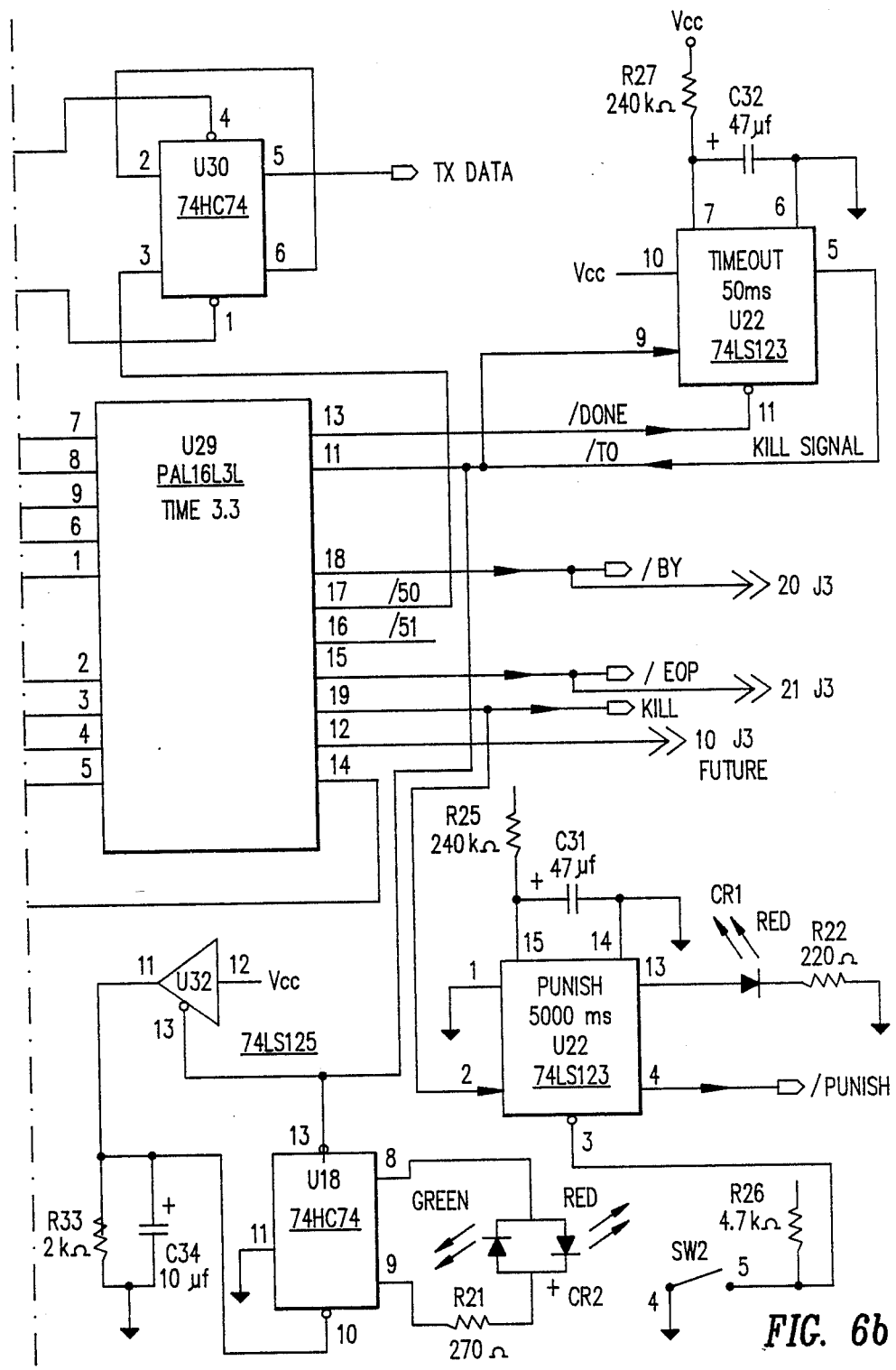

FIGS. 5 and 6 are detailed schematic views of one embodiment of a transceiver circuit and a timing circuit. From the above description, practice of the invention according to FIGS. 5 and 6 should be clear to one of ordinary skill in the art.

I claim:

1. In a local access network for facilitating communication between computer products, where the network uses two unshielded wires as a signal line to transport messages between the computer products, a multiport signal regenerator that comprises:

a plurality of substantially identical transformers, with one transformer being associated with and connected to each computer product, with each transformer having two primary terminals and two secondary terminals, with the two primary terminals being connected by two wires of a signal line to the associated computer product in the network;

a transceiver circuit connected to the two secondary terminals of each transformer, to receive a message from a source computer product in the network, to transmit a copy of this message to all other computer products in the network, to lock out all other messages received from other computer products while the current message is being received and processed by the circuit, to sense the end of the message being currently received by the circuit, and to re-arm the circuit to receive and process another incoming message at a predetermined idle time interval after the end of the current message is received, where the predetermined idle time is determined by the circuit itself; and a timing circuit connected to the transceiver circuit, to receive a copy of the current message, to measure the temporal length $\Delta t_m$ of the current message, to issue a disable command to the transceiver circuit that commands the transceiver circuit to ignore or lock out the remainder of the current message and any subsequent messages received from the source computer product for a predetermined punishment time interval $\Delta t_2$ thereafter, if $\Delta t_m$ exceeds a predetermined protocol time interval $\Delta t_1$.

2. A regenerator according to claim 1, wherein said idle time interval may vary from substantially 8 μsec. to substantially 35 μsec.

3. A regenerator according to claim 1, wherein said protocol time interval $\Delta t_1$ is substantially 25 msec, or greater.

4. A regenerator according to claim 1, wherein said transceiver circuit includes, for each of said transformers and said associated computer product:

a first receiver driver means having two input terminals and an output terminal, with the first input terminal and second input terminal of the first receiver driver means being connected to the first and second secondary terminals of said transformer and with the threshold voltage for transition of this driver means being set at a predetermined non-zero voltage $V_T$;

a second receiver driver means having two input terminals and an output terminal, with the first and second input terminals of the second driver received means being connected to the second and first secondary terminals of said transformer and with the threshold voltage from transition of this driver means being set at a predetermined non-zero voltage $V_T$; and a transmission driver means having two input terminals and two output terminals, with the first and second output terminals being connected, respectively, to said first and second secondary terminals of said transformer, with the first input terminal of the transmission driver means being adapted to receive a data signal that is to be transmitted at the output terminals of this driver means, and with the second input terminal of this driver means being adapted to receive an enable/disable signal that enables this driver means to transmit signals at its output terminals or, alternatively, prevents this driver means from transmitting any signal at its output terminals.

5. A regenerator according to claim 4, wherein said transceiver circuit further includes a port selection circuit, having a plurality of input terminals and a plurality of output terminals that receives said output signals from each of said receiver driver means, determines which two signals from a pair of said receiver driver means shall be given priority at a given time, issues these two output signals at first and second output terminals, respectively, of the port selection circuit, issues a third output signal at a third output terminal that indicates whether the regenerator is currently receiving a message from at least one of said computer products, and issues a fourth output signal that disables said transmission driver means associated with said source computer product and issues a plurality of output signals that enable said transmission driver means associated with all of said computer products on said network except said source computer product;

a message logic circuit, having two input terminals and two output terminals, that receives the first and second output signals from the port selection circuit, issues at a first output terminal a first signal that is substantially a replica of the signal received by the regenerator from said source computer product and issues at a second output terminal a second signal indicating that the first and second output signals from the port select circuit each have a predetermined value that indicates that no signal is currently being received by the regenerator from any of said computer products, where the first output terminal of the message logic circuit is connected to said first input terminal of all of said transmission driver means;

an idle time logic circuit, having two input terminals and one output terminal, with its first input terminal connected to the third output terminal of the port selection circuit, with its second input terminal connected to the second output terminal of the message logic circuit and with its first output terminal connected to an input terminal of the port selection circuit, to sense when the end of a signal from said source computer product occurs, to measure the time interval elapsed after the end of such signal occurs, to sense at a first predetermined idle time thereafter whether no signals are currently being received by the regenerator from any of said computer products, and to activate the port selection circuit thereafter within a predetermined time interval so that the regenerator is reactivated and can again receive and process signals from said computer products.

* * * * *

UNITED STATES PATENT AND TRADEMARK OFFICE
CERTIFICATE OF CORRECTION

PATENT NO.   : 4,943,979
DATED        : July 24, 1990
INVENTOR(S)  : Harold H. Webber, Jr.

It is certified that error appears in the above-identified patent and that said Letters Patent is hereby corrected as shown below: Title page: Item (54)

Title should read --LOCAL ACCESS NETWORK SIGNAL REGENERATOR--.

Column 1, line 35, after "Farallon Computing, Inc.," please insert --(Now abandoned. Continuation 07/267,759 filed Oct. 27, 1988 which issued as U.S. Pat. No. 4,901,342 on Feb. 13, 1990.)--.

Column 4, line 23, "receiver/circuit" should read --receiver circuit--.

Column 6, lines 16-17, the line should not be broken as shown.

Column 8, lines 62-63, the sentence should not be written in italics.

Column 9, line 7, "form" should read --from--.

Column 9, line 59, ">50" should read --<50--.

Signed and Sealed this

Twenty-first Day of July, 1992

Attest:

DOUGLAS B. COMER

*Attesting Officer*    *Acting Commissioner of Patents and Trademarks*